(12) United States Patent
Bao et al.

(10) Patent No.: US 9,760,719 B2
(45) Date of Patent: Sep. 12, 2017

(54) ELECTRONIC SYSTEM WITH PRIVACY MECHANISM AND METHOD OF OPERATION THEREOF

(71) Applicant: Samsung Electronics Co., Ltd., Suwon-si, Gyeonggi-Do (KR)

(72) Inventors: Xuan Bao, San Jose, CA (US); Lu Luo, Sunnyvale, CA (US); Emmanuel Munguia Tapia, Newark, CA (US); Evan Welbourne, San Francisco, CA (US); Jun Yang, Milpitas, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 116 days.

(21) Appl. No.: 14/323,620

(22) Filed: Jul. 3, 2014

(65) Prior Publication Data
US 2016/0004873 A1     Jan. 7, 2016

(51) Int. Cl.
*G06F 21/60* (2013.01)
*G06F 3/0484* (2013.01)
*G06F 21/62* (2013.01)

(52) U.S. Cl.
CPC .......... *G06F 21/602* (2013.01); *G06F 3/0484* (2013.01); *G06F 21/6254* (2013.01)

(58) Field of Classification Search
CPC ............................. G06F 21/602; G06F 3/0484
See application file for complete search history.

(56) References Cited

U.S. PATENT DOCUMENTS

| | | | |
|---|---|---|---|
| 8,626,618 B2 | 1/2014 | Psota et al. | |
| 2008/0098236 A1* | 4/2008 | Pandey | G06F 11/1464 713/189 |
| 2010/0250918 A1* | 9/2010 | Tremblay | H04L 47/2441 713/150 |
| 2013/0035979 A1 | 2/2013 | Tenbrock | |
| 2013/0268357 A1 | 10/2013 | Heath | |

* cited by examiner

*Primary Examiner* — Ellen Tran
(74) *Attorney, Agent, or Firm* — IP Investment Law Group (57) ABSTRACT

An electronic system includes: a control unit configured to: generate an encrypted information based on encrypting an information type, generate a mapping table including the encrypted information, the information type, or a combination thereof, generate a restored information based on mapping a decomposed information of the encrypted information, categorized according to a decomposition rule, to a corresponding instance of the information type in the mapping table, and a user interface, coupled to the control unit, configure to display the restored information on an activity dashboard for receiving a user entry to calibrate the decomposition rule.

30 Claims, 6 Drawing Sheets

ELECTRONIC SYSTEM WITH PRIVACY MECHANISM AND METHOD OF OPERATION THEREOF

TECHNICAL FIELD

An embodiment of the present invention relates generally to an electronic system, and more particularly to a system for privacy mechanism.

BACKGROUND

Modern portable consumer and industrial electronics, especially client devices such as navigation systems, cellular phones, portable digital assistants, and combination devices are providing increasing levels of functionality to support modem life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide personalized content through a mobile device, such as a cell phone, smart phone, or a personal digital assistant.

Personalized content services allow users to create, transfer, store, and/or consume information in order for users to create, transfer, store, and consume in the "real world." One such use of personalized content services is to efficiently transfer or guide users to the desired product or service.

Electronic system and personalized content services enabled systems have been incorporated in automobiles, notebooks, handheld devices, and other portable products. Today, these systems aid users by incorporating available, real-time relevant information, such as advertisement, entertainment, local businesses, or other points of interest (POI).

Thus, a need still remains for an electronic system with privacy mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an electronic system including: a control unit configured to: generate an encrypted information based on encrypting an information type, generate a mapping table including the encrypted information, the information type, or a combination thereof, generate a restored information based on mapping a decomposed information of the encrypted information, categorized according to a decomposition rule, to a corresponding instance of the information type in the mapping table, and a user interface, coupled to the control unit, configure to display the restored information on an activity dashboard for receiving a user entry to calibrate the decomposition rule.

An embodiment of the present invention provides an electronic system including: a communication interface configured to receive an encrypted information of an information type; a control unit, coupled to the communication interface, configured to: generate a decomposed information based on comparing the encrypted information to a training set according to a decomposition rule for categorizing the decomposed information in an intention category, update the decomposition rule based on a user entry for controlling the encrypted information being categorized.

An embodiment of the present invention provides a method of operation of an electronic system including: generating an encrypted information with a control unit based on encrypting an information type; generating a mapping table including the encrypted information, the information type, or a combination thereof; generating a restored information based on mapping a decomposed information of the encrypted information, categorized according to a decomposition rule, to a corresponding instance of the information type in the mapping table; and displaying the restored information on an activity dashboard for receiving a user entry to calibrate the decomposition rule.

An embodiment of the present invention provides a method of operation of an electronic system including: receiving an encrypted information of an information type; generating a decomposed information based on comparing the encrypted information to a training set according to a decomposition rule for categorizing the decomposed information in an intention category; and updating the decomposition rule based on a user entry with a control unit for controlling the encrypted information being categorized.

An embodiment of the present invention provides a non-transitory computer readable medium including instructions for execution by a control unit including: generating an encrypted information based on encrypting an information type; generating a mapping table including the encrypted information, the information type, or a combination thereof; generating a restored information based on mapping a decomposed information of the encrypted information, categorized according to a decomposition rule, to a corresponding instance of the information type in the mapping table; and displaying the restored information on an activity dashboard for receiving a user entry to calibrate the decomposition rule.

An embodiment of the present invention provides a non-transitory computer readable medium including instructions for execution by a control unit including: receiving an encrypted information of an information type; generating a decomposed information based on comparing the encrypted information to a training set according to a decomposition rule for categorizing the decomposed information in an intention category; and updating the decomposition rule based on a user entry for controlling the encrypted information being categorized.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

The following embodiments of the present invention improve the user's privacy by controlling an information type shared to the public. By encrypting a private information before sharing the private information to the outside world, the public cannot disclose the private information. Further, by having a mapping table residing on a user's device, the user can validate the accuracy of categorizing the private information encrypted. The user can tune the categorization of the private information by updating a decomposition rule.

The following embodiments of the present invention generates the encrypted information based on encrypting the information type improves the user's privacy for sharing the user's personal information. By generating the mapping table including the encrypted information, the information type, or a combination thereof residing on the first device, the electronic system can keep the private information exposed within the first device only. Further, by generating the restored information based on mapping the decomposed information of the encrypted information to the corresponding instance of the information type in the mapping table, the electronic system can validate the accuracy of categorization according to the decomposition rule. As a result, the user can calibrate the decomposition rule on the activity dashboard for enhanced privacy for operating the first device, the electronic system, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
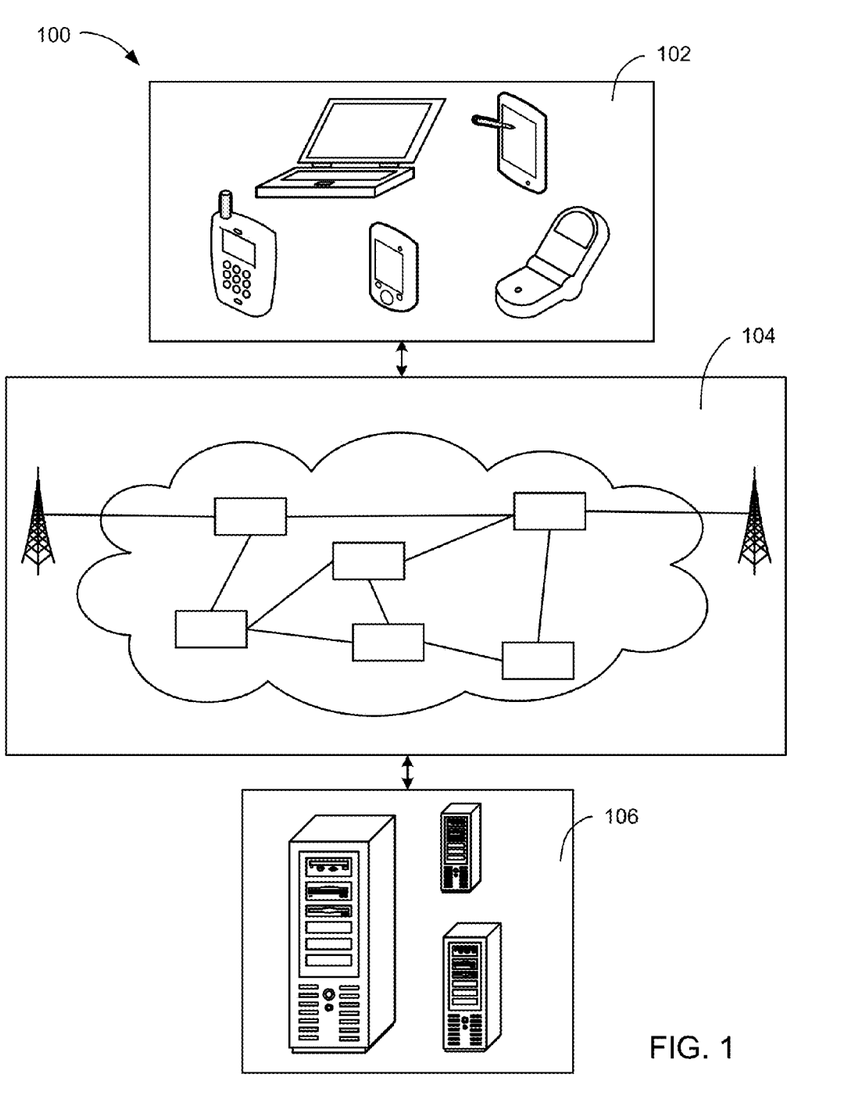
FIG. 1 is an electronic system with privacy mechanism in an embodiment of the present invention.

Referring now to FIG. 1, therein is shown an electronic system 100 with privacy mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, wearable digital device, tablet, notebook computer, television (TV), automotive telematic communication system, or other multi-functional mobile communication or entertainment device. The first device 102 can be a stand-alone device, or can be incorporated with a vehicle, for example a car, truck, bus, aircraft, boat/vessel, or train. The first device 102 can couple to the communication path 104 to communicate with the second device 106.

For illustrative purposes, the electronic system 100 is described with the first device 102 as a display device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, a rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, a personal digital assistant, or a cellular phone, and as specific examples, an Apple iPhone™, Android™ smartphone, or Windows™ platform smartphone.

For illustrative purposes, the electronic system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
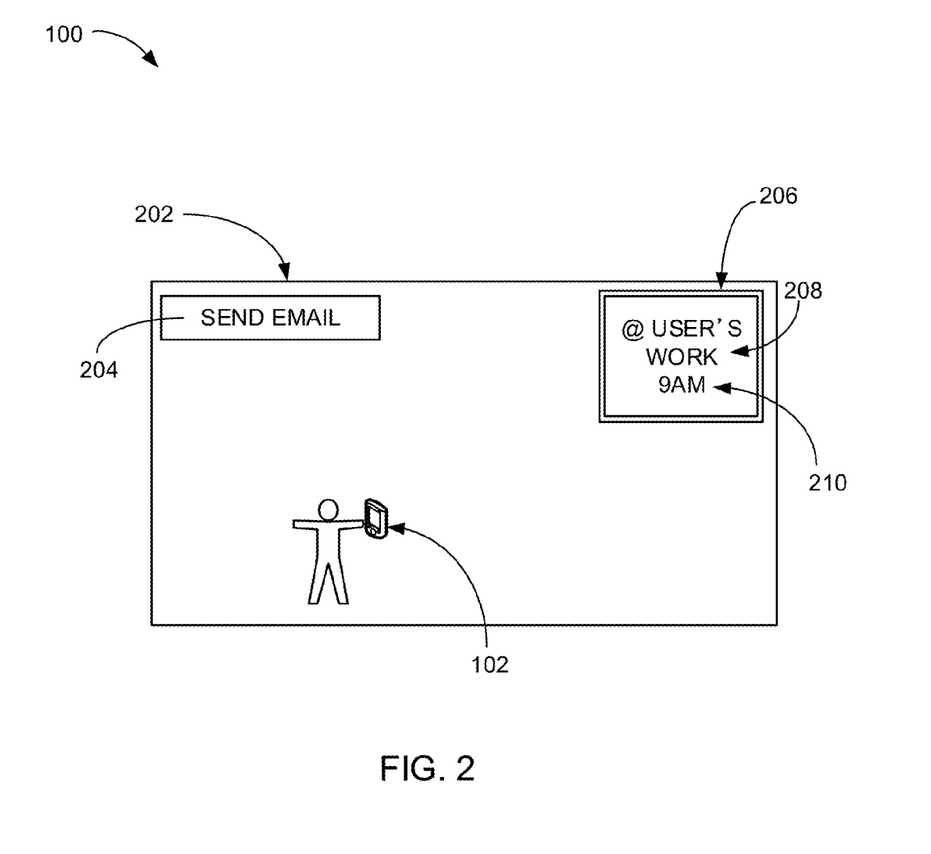
FIG. 2 is an example of an activity context.

Referring now to FIG. 2, therein is shown an example of an activity context 202. For clarity and brevity, the discussion of the present invention will focus on the first device 102 displaying the result generated by the electronic system 100. However, the second device 106 of FIG. 1 and the first device 102 can be discussed interchangeably.

The activity context 202 is a situation or circumstance surrounding when an activity type 204 is performed. For example, the electronic system 100 can determine the activity context 202 based on an activity condition 206.

The activity condition 206 is a factor of factors when comprised create the activity context 202. For example, the activity condition 206 can include a user location 208, a timeframe 210, or a combination thereof. The user location 208 is a physical location where the first device 102 is located. For example, the user location 208 can include a current location, a past location, or a future location. The timeframe 210 is a period of time. For example, the timeframe 210 can include a time of day, week, month, year, season, or a combination thereof.

The activity type 204 is action performed on the first device 102. For example, the activity type 204 can include browsing history of internet, software application usage on the first device 102, physical activity, such as exercising, or a combination thereof.

For further example, the timeframe 210 can represent morning on a weekday. The user location 208 can represent the current location of first device 102 at the user's workplace. The activity type 204 performed can represent sending an email. Based on the activity condition 206 and the activity type 204, the electronic system 100 can determine the activity context 202 of the user of the electronic system 100 to represent that the user is at work working.

Figure 3:
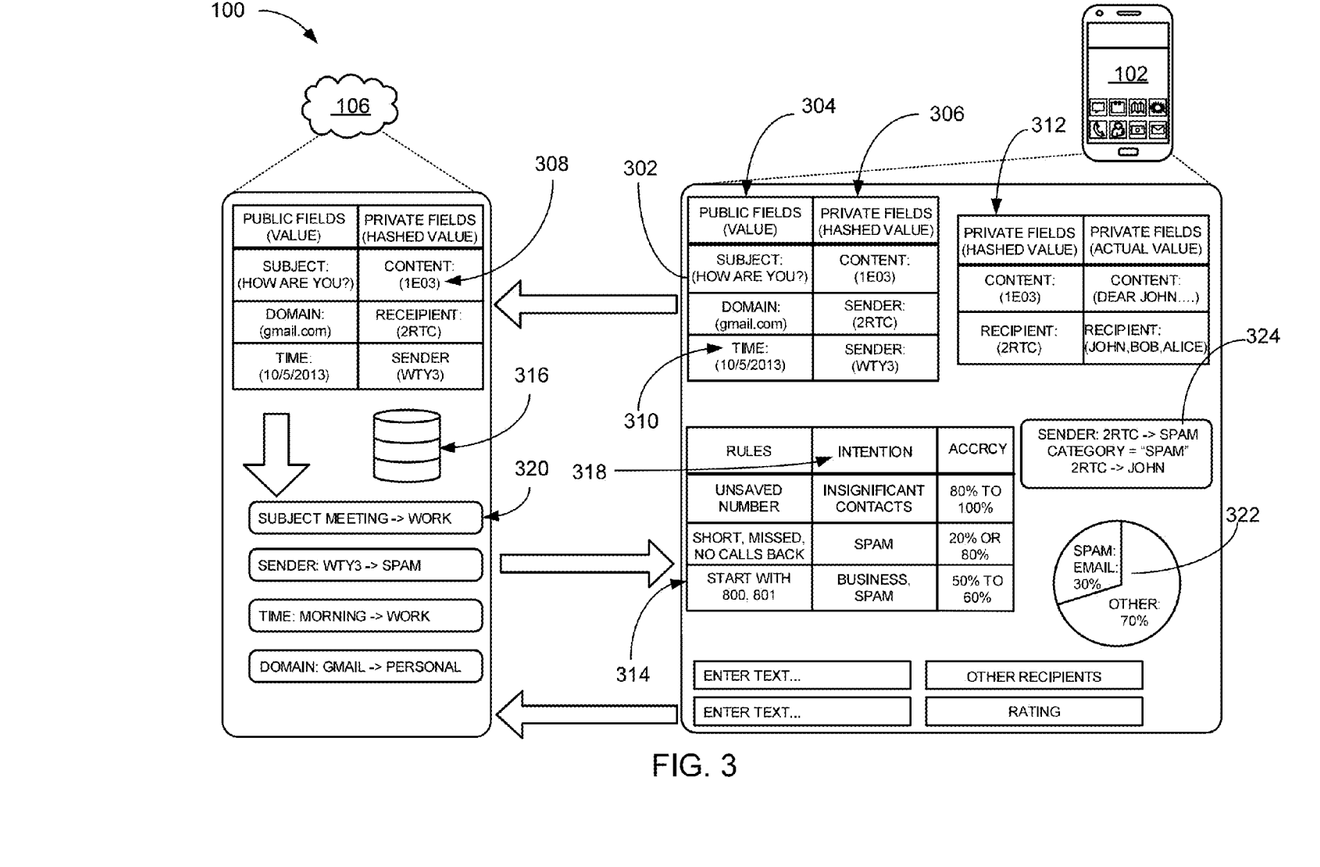
FIG. 3 is an example of system architecture of the electronic system.

Referring now to FIG. 3, therein is shown an example of system architecture of the electronic system 100. For example, the first device 102 can communicate an information type 302 including a public information 304, a private information 306, or a combination thereof to the second device 106.

The information type 302 is a category of information. For example, the information type 302 can include the public information 304, which is information exposable to the public. The information type 302 can include the private information 306, which is information not exposable to the public. For further example, the user of the electronic system 100 can share the public information 304 to the public without encrypting the public information 304. However, the user of the electronic system 100 can avoid sharing the private information 306 unless the private information 306 is encrypted.

An encrypted information 308 is an encrypted instance of the information. For example, the electronic system 100 can encrypt the private information 306 to generate the encrypted information 308. The first device 102 can share the encrypted information 308 to the second device 102.

A content type 310 is a category of the content. For example, the information type 302 can include the content type 310. More specifically, the private information 306 can include the content type 310 of the user location 208 of FIG. 2, the timeframe 210 of FIG. 2 when the activity type 204 of FIG. 2 was performed, audio information, user generated video and images, or a combination thereof.

For further example, the content type 310 can include a field type of the information type 302. For example, the content type 310 can represent an email. Moreover, the email can include the content type 310 of the field type, such as sender, receiver, content, domain, the timeframe 210, or a combination thereof.

For further example, the electronic system 100 can encrypt an entire instance of the content type 310 of the public information 304, the private information 306, or a combination thereof to generate the encrypted information 308. For a different example, the electronic system 100 can encrypt a partial instance of the content type 310 of the public information 304, the private information 306, or a combination thereof to generate the encrypted information 308. More specifically, if the content type 310 can represent an email, the electronic system 100 can encrypt the field type of sender, receiver, content, or a combination thereof to generate the encrypted information 308. The field type representing domain, the timeframe 210, or a combination thereof can remain as the public information 304, thus, unencrypted.

A mapping table 312 is a grouping of key-value pair for the information type 302 and the encrypted information 308. For example, the key-value pair can have the encrypted information 308 as the key and the private information 306 as the value. For a specific example, the encrypted information 308 for the content type 310 of recipient can represent "2RTC." The private information 306 mapped to "2RTC" in the mapping table 312 can represent "John." As a result, "2RTC" can represent "John" when the encrypted information 308 is unencrypted. The mapping table 312 can reside on the first device 102 and not reside on the second device 106, for example.

A decomposition rule 314 is a restriction for comparing the encrypted information 308 to a training set 316 to identify the user's intention for the encrypted information 308. For example, the decomposition rule 314 can include learning algorithm such as a decision tree, multiple regression, naïve Bayes, or a combination thereof.

For a specific example, the electronic system 100 can implement the decomposition rule 314 to categorize the encrypted information 308 into an intention category 318 including "Personal," "Work," "Spam," or a combination thereof without revealing the content of the information type 302. The intention category 318 is a classification of user's intent for categorizing a decomposed information 320.

The training set 316 is set of information to predict the user's intention on how to categorize the encrypted information 308. For example, based on the training set 316 including the content type 310 representing "Domain: Gmail™," the user intended the encrypted information 308 for the content type 310 of "Gmail™" to represent the intention category 318 of "Personal." The training set 316 can represent past information accumulated as an activity history 322.

The decomposed information 320 is the encrypted information 308 categorized under the intention category 318 according to the decomposition rule 314. For example, the electronic system 100 can generate the decomposed information 320 based on comparing the encrypted information 308 to the training set 316 according to the decomposition rule 314. The activity history 322 can include a log of the activity type 204 performed by the user, calibration of the decomposition rule 314 performed by the user, or a combination thereof.

The electronic system 100 can generate a restored information 324. The restored information 324 is an instance of the information type 302 unencrypted after a comparison of the encrypted information 308 to the mapping table 312 to obtain the actual value of the information type 302.

Figure 4:
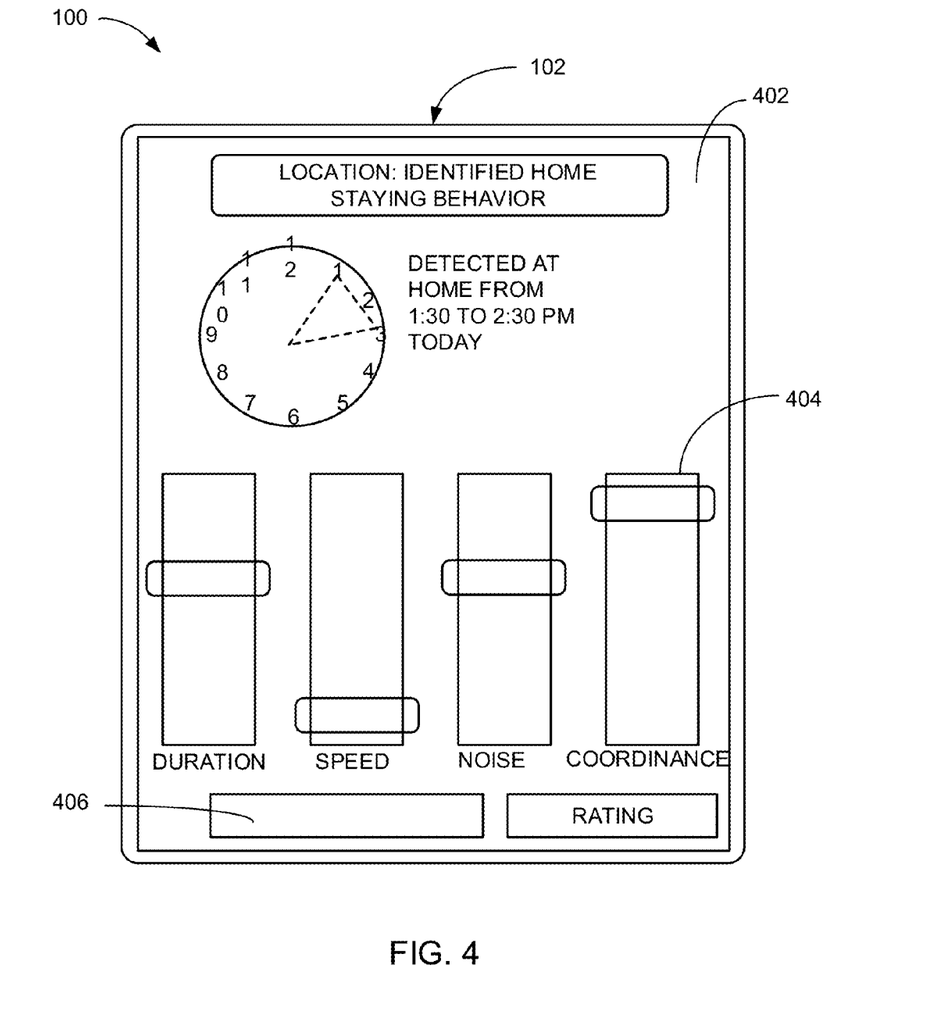
FIG. 4 is an example of an activity dashboard.

Referring now to FIG. 4, therein is shown an example of an activity dashboard 402. The activity dashboard 402 a user interface to calibrate the decomposition rule 314 of FIG. 3. For example, the first device 102 can display the activity dashboard 402, which can include a calibration functionality 404. The calibration functionality 404 can represent a widget displayed on the activity dashboard 402 to adjust the decomposition rule 314.

For example, the activity dashboard 402 can receive a user entry 406 to manipulate the calibration functionality 404 to adjust the decomposition rule 314. For further example, the user entry 406 can tune the weight for the decomposition rule 314 representing the decision tree, the multiple regression, the naïve Bayes, or a combination thereof. By tuning the weight, the electronic system 100 can calibrate the comparison of the encrypted information 308 of FIG. 3 to the training set 316 of FIG. 3 for improving the accuracy of the decomposed information 320 of FIG. 3 being categorized under the appropriate instance of the intention category 318 of FIG. 3. The electronic system 100 can share the updated instance of the decomposition rule 314 from the first device 102 to the second device 106 to improve the comparison between the encrypted information 308 and the training set 316.

Figure 5:
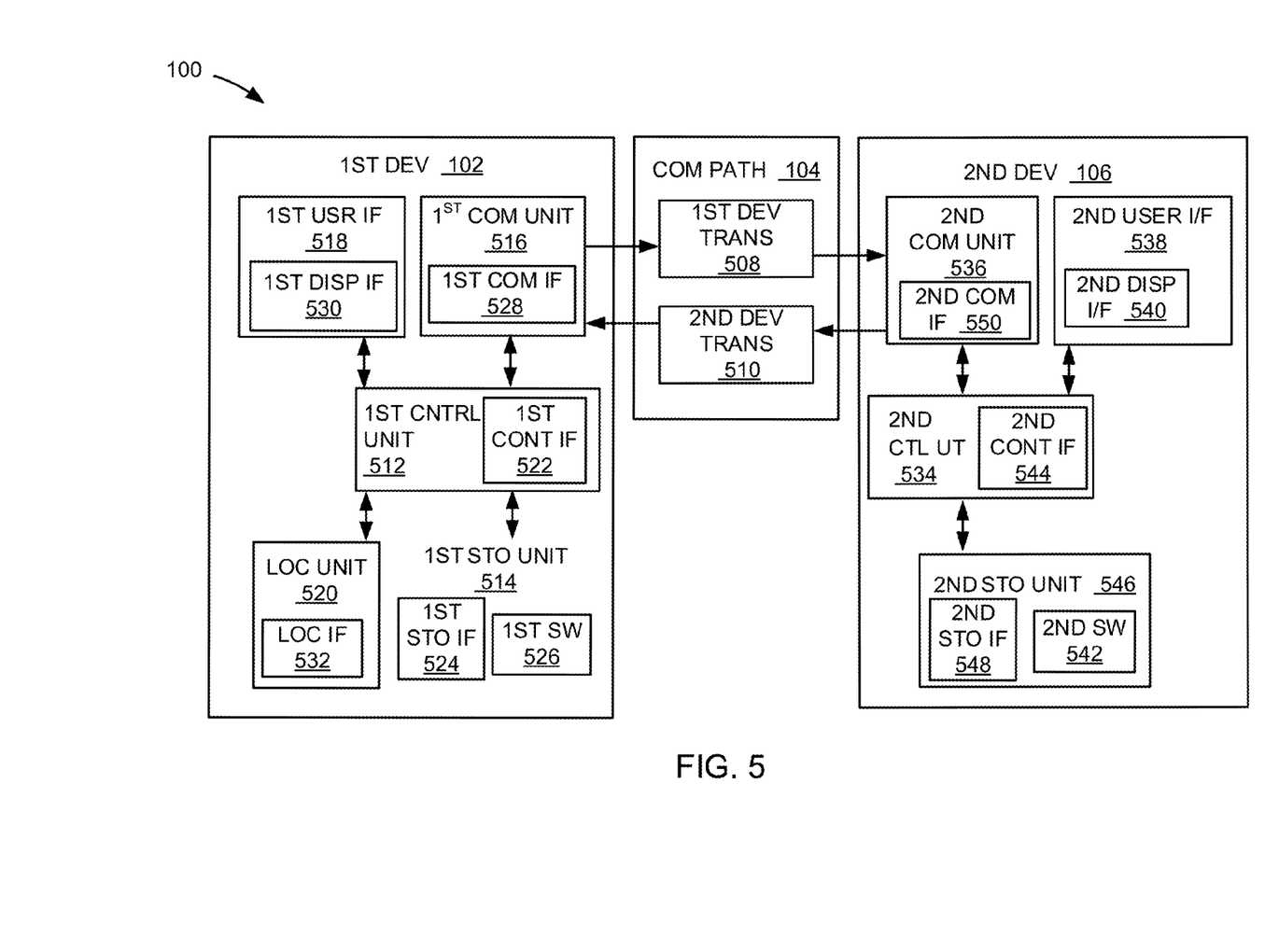
FIG. 5 is an exemplary block diagram of the electronic system.

Referring now to FIG. 5, therein is shown an exemplary block diagram of the electronic system 100. The electronic system 100 can include the first device 102, the communication path 104, and the second device 106. The first device 102 can send information in a first device transmission 508 over the communication path 104 to the second device 106. The second device 106 can send information in a second device transmission 510 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The first device 102 can include a first control unit 512, a first storage unit 514, a first communication unit 516, a first user interface 518, and a location unit 520. The first control unit 512 can include a first control interface 522. The first control unit 512 can execute a first software 526 to provide the intelligence of the electronic system 100.

The first control unit 512 can be implemented in a number of different manners. For example, the first control unit 512 can be a processor, an application specific integrated circuit (ASIC) an embedded processor, a microprocessor, a hardware control logic, a hardware finite state machine (FSM), a digital signal processor (DSP), or a combination thereof. The first control interface 522 can be used for communication between the first control unit 512 and other functional units in the first device 102. The first control interface 522 can also be used for communication that is external to the first device 102.

The first control interface 522 can receive information from the other functional units or from external sources, or can transmit information to the other functional units or to external destinations. The external sources and the external destinations refer to sources and destinations physically separate from to the first device 102.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system (MEMS), optical circuitry, waveguides, wireless circuitry, wireline circuitry, or a combination thereof.

The location unit 520 can generate location information, current heading, and current speed of the first device 102, as examples. The location unit 520 can be implemented in many ways. For example, the location unit 520 can function as at least a part of a global positioning system (GPS), an inertial navigation system, a cellular-tower location system, a pressure location system, or any combination thereof.

The location unit 520 can include a location interface 532. The location interface 532 can be used for communication between the location unit 520 and other functional units in the first device 102. The location interface 532 can also be used for communication that is external to the first device 102.

The location interface 532 can receive information from the other functional units or from external sources, or can transmit information to the other functional units or to external destinations. The external sources and the external destinations refer to sources and destinations physically separate from the first device 102.

The location interface 532 can include different implementations depending on which functional units or external units are being interfaced with the location unit 520. The location interface 532 can be implemented with technologies and techniques similar to the implementation of the first control interface 522.

The first storage unit 514 can store the first software 526. The first storage unit 514 can also store the relevant information, such as advertisements, points of interest (POI), navigation routing entries, or any combination thereof. The relevant information can also include news, media, events, or a combination thereof from the third party content provider.

The first storage unit 514 can be a volatile memory, a nonvolatile memory, an internal memory, an external memory, or a combination thereof. For example, the first storage unit 514 can be a nonvolatile storage such as non-volatile random access memory (NVRAM), Flash memory, disk storage, or a volatile storage such as static random access memory (SRAM).

The first storage unit 514 can include a first storage interface 524. The first storage interface 524 can be used for communication between and other functional units in the first device 102. The first storage interface 524 can also be used for communication that is external to the first device 102.

The first storage interface 524 can receive information from the other functional units or from external sources, or can transmit information to the other functional units or to external destinations. The external sources and the external destinations refer to sources and destinations physically separate from the first device 102.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the first device 102. For example, the first communication unit 516 can permit the first device 102 to communicate with the second device 106 of FIG. 1, an attachment, such as a peripheral device or a computer desktop, and the communication path 104.

The first communication unit 516 can also function as a communication hub allowing the first device 102 to function as part of the communication path 104 and not limited to be an end point or terminal unit to the communication path 104. The first communication unit 516 can include active and passive components, such as microelectronics or an antenna, for interaction with the communication path 104.

The first communication unit 516 can include a first communication interface 528. The first communication interface 528 can be used for communication between the first communication unit 516 and other functional units in the first device 102. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user (not shown) to interface and interact with the first device 102. The first user interface 518 can include an input device and an output device. Examples of the input device of the first user interface 518 can include a keypad, a touchpad, soft-keys, a keyboard, a microphone, an infrared sensor for receiving remote signals, or any combination thereof to provide data and communication inputs.

The first user interface 518 can include a first display interface 530. The first display interface 530 can include a display, a projector, a video screen, a speaker, or any combination thereof.

The first control unit 512 can operate the first user interface 518 to display information generated by the electronic system 100. The first control unit 512 can also execute the first software 526 for the other functions of the electronic system 100, including receiving location information from the location unit 520. The first control unit 512 can further execute the first software 526 for interaction with the communication path 104 via the first communication unit 516.

The second device 106 can be optimized for implementing the embodiment of the present invention in a multiple device embodiment with the first device 102. The second device 106 can provide the additional or higher performance processing power compared to the first device 102. The second device 106 can include a second control unit 534, a second communication unit 536, and a second user interface 538.

The second user interface 538 allows a user (not shown) to interface and interact with the second device 106. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a projector, a video screen, a speaker, or any combination thereof.

The second control unit 534 can execute a second software 542 to provide the intelligence of the second device 106 of the electronic system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the electronic system 100, including operating the second communication unit 536 to communicate with the first device 102 over the communication path 104.

The second control unit 534 can be implemented in a number of different manners. For example, the second control unit 534 can be a processor, an embedded processor, a microprocessor, hardware control logic, a hardware finite state machine (FSM), a digital signal processor (DSP), or a combination thereof.

The second control unit 534 can include a second control interface 544. The second control interface 544 can be used for communication between the second control unit 534 and other functional units in the second device 106. The second control interface 544 can also be used for communication that is external to the second device 106.

The second control interface 544 can receive information from the other functional units or from external sources, or can transmit information to the other functional units or to external destinations. The external sources and the external destinations refer to sources and destinations physically separate from the second device 106.

The second control interface 544 can be implemented in different ways and can include different implementations depending on which functional units or external units are being interfaced with the second control interface 544. For example, the second control interface 544 can be implemented with a pressure sensor, an inertial sensor, a microelectromechanical system (MEMS), optical circuitry, waveguides, wireless circuitry, wireline circuitry, or a combination thereof.

A second storage unit 546 can store the second software 542. The second storage unit 546 can also store the relevant information, such as advertisements, points of interest (POI), navigation routing entries, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the electronic system 100 is shown with the second storage unit 546 as a single hierarchy storage system, although it is understood that the electronic system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory (NVRAM), Flash memory, disk storage, or a volatile storage such as static random access memory (SRAM).

The second storage unit 546 can include a second storage interface 548. The second storage interface 548 can be used for communication between other functional units in the second device 106. The second storage interface 548 can also be used for communication that is external to the second device 106.

The second storage interface 548 can receive information from the other functional units or from external sources, or can transmit information to the other functional units or to external destinations. The external sources and the external destinations refer to sources and destinations physically separate from the second device 106.

The second storage interface 548 can include different implementations depending on which functional units or external units are being interfaced with the second storage unit 546. The second storage interface 548 can be implemented with technologies and techniques similar to the implementation of the second control interface 544.

The second communication unit 536 can enable external communication to and from the second device 106. For example, the second communication unit 536 can permit the second device 106 to communicate with the first device 102 over the communication path 104.

The second communication unit 536 can also function as a communication hub allowing the second device 106 to function as part of the communication path 104 and not limited to be an end point or terminal unit to the communication path 104. The second communication unit 536 can include active and passive components, such as microelectronics or an antenna, for interaction with the communication path 104.

The second communication unit 536 can include a second communication interface 550. The second communication interface 550 can be used for communication between the second communication unit 536 and other functional units in the second device 106. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second control interface 544.

The first communication unit 516 can couple with the communication path 104 to send information to the second device 106 in the first device transmission 508. The second device 106 can receive information in the second communication unit 536 from the first device transmission 508 of the communication path 104.

The second communication unit 536 can couple with the communication path 104 to send information to the first device 102 in the second device transmission 510. The first device 102 can receive information in the first communication unit 516 from the second device transmission 510 of the communication path 104. The electronic system 100 can be executed by the first control unit 512, the second control unit 534, or a combination thereof. For illustrative purposes, the second device 106 is shown with the partition having the second user interface 538, the second storage unit 546, the second control unit 534, and the second communication unit 536, although it is understood that the second device 106 can have a different partition. For example, the second software 542 can be partitioned differently such that some or all of its function can be in the second control unit 534 and the second communication unit 536. Also, the second device 106 can include other functional units not shown in FIG. 5 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100. For example, the first device 102 is described to operate the location unit 520, although it is understood that the second device 102 can also operate the location unit 520.

Figure 6:
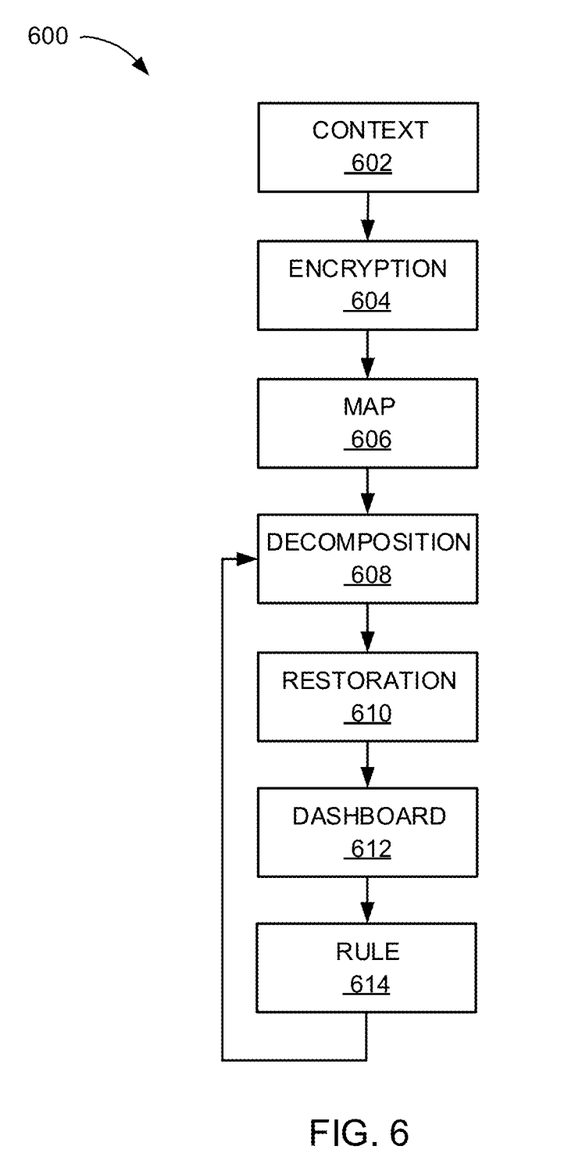
FIG. 6 is a control flow of the electronic system.

Referring now to FIG. 6, therein is shown a control flow 600 of the electronic system 100 of FIG. 1. The electronic system 100 can include a context module 602. The context module 602 determines the activity context 202 of FIG. 2. For example, the context module 602 can determine the activity context 202 based on the activity condition 206 of FIG. 2.

The context module 602 can determine the activity context 202 in a number of ways. For example, the activity condition 206 can include the user location 208 of FIG. 2, the timeframe 210 of FIG. 2, or a combination thereof. The user location 208 can represent the user's workplace. The timeframe 210 can represent 11 am on Wednesday. Based on the activity condition 206, the context module 602 can determine the activity context 202 to represent that the user is at work. The context module 602 can communicate the activity context 202 to an encryption module 604.

The electronic system 100 can include the encryption module 604, which can couple to the context module 602. The encryption module 604 generates the encrypted information 308 of FIG. 3. For example, the encryption module 604 can generate the encrypted information 308 based on the information type 302 of FIG. 3, the activity history 322 of FIG. 3, the activity context 202, or a combination thereof.

The encryption module 604 can generate the encrypted information 308 in a number of ways. For example, the encryption module 604 can generate the encrypted information 308 based on the information type 302 representing the public information 304 of FIG. 3, the private information 306 of FIG. 3, or a combination thereof. As an example, the encryption module 604 can generate the encrypted information 308 based on the private information 306 with an encryption algorithm.

The encryption algorithm can include a symmetric key encryption, a public-key encryption, or a combination thereof. More specifically, the encryption algorithm can include a cryptographic hash function, Gaussian blur, or a combination thereof. The encryption module 604 can generate the encrypted information 308 based on encrypting the private information 306 using, for example, the hash function.

For a specific example, the encryption module 604 can generate the encrypted information 308 based on the content type 310 of FIG. 3 of the information type 302, the activity type 204 of FIG. 2, the activity history 322, or a combination thereof. The activity type 204 can represent sending an email. The email can include the public information 304, the private information 306, or a combination thereof.

The activity history 322 can indicate that the content type 310 representing the subject of the email, the domain of the email, the timeframe 210 of the email, or a combination thereof can be deemed as the public information 304. Further, the activity history 322 can indicate that the content type 310 representing the content of the email, the sender of the mail, or a combination thereof can be deemed as the private information 306. The encryption module 604 can generate the encrypted information 308 based on the activity history 322 to encrypt the content type 310 indicated as the private information 306. More specifically, the encryption module 604 can generate the encrypted information 308 by encrypting the content of the email, the sender of the mail, or a combination thereof with hash code.

For a different example, the encryption module 604 can generate the encrypted information 308 based on the activity context 202, the activity type 204, the activity history 322, the information type 302, or a combination thereof. The user location 208 can represent a dance club and bar. The timeframe 210 can represent 12 am on a Saturday. Accordingly the activity context 202 can be determined that the user is out on a Friday night.

The activity type 204 can represent sharing content on the social network site. The activity history 322 can indicate that the content type 310 representing the picture of certain user's friend tagged in the picture can be deemed as the private information 306. The encryption module 604 can generate the encrypted information 308 by encrypting the face of the user's friend deemed as the private information 306 with encryption algorithm, such as Gaussian blur. The encryption module 604 can communicate the public information 304, the encrypted information 308, or a combination thereof to a map module 606, a decomposition module 608, or a combination thereof.

The electronic system 100 can include the map module 606, which can couple to the encryption module 604. The map module 606 generates the mapping table 312 of FIG. 3. For example, the map module 606 can generate the mapping table 312 based on the encrypted information 308, the information type 302, or a combination thereof.

More specifically, the map module 606 can generate the mapping table 312 based on pairing the encrypted information 308 and the corresponding instance of the private information 306. For example, the private information 306 can represent the recipient of an email, such as the value representing "John." The encrypted information 308 representing the recipient can represent the hash value of "2RTC."

The map module 606 can generate the mapping table 312 by having the encrypted information 308 as the key and private information 306 as the value to the mapping table 312. The key-value pair of the mapping table 312 can also be vice versa, such as having the private information 306 as the key. The map module 606 can store the mapping table 312 on the first device 102 of FIG. 1 and not shared with other devices, such as the second device 106 of FIG. 1.

The electronic system 100 can include the decomposition module 608, which can couple to the map module 606. The decomposition module 608 generates the decomposed information 320 of FIG. 3. For example, the decomposition module 608 can generate the decomposed information 320 based on the information type 302.

The decomposition module 608 can generate the decomposed information 320 in a number of ways. For example, the decomposition module 608 can generate the decomposed information 320 based on the information type 302 of the private information 306 that has been encrypted, the public information 304, or a combination thereof. More specifically, the decomposition module 608 can generate the decomposed information 320 based on comparing the information type 302, the encrypted information 308, or a combination thereof to the training set 316 of FIG. 3.

For example, the public information 304 can include the content type 310 representing the subject of the email, the timeframe 210 when the email was sent, the domain of email service used to send the email, or a combination thereof. The encrypted information 308 can include the content type 310 representing the recipient of the email. The training set 316 can include the content type 310 representing the subject of the email, the timeframe 210 when the email was sent, the domain of email service used to send the email, the recipient of the email, or a combination thereof.

The decomposition module 608 can generate the decomposed information 320 based on comparing the public information 304, the encrypted information 308, or a combination thereof to the training set 316. The decomposition module 608 can compare based on the decomposition rule 314 of FIG. 3. For example, the decomposition rule 314 can include a decision tree, multiple regression, machine learning, data mining, or a combination thereof. For a specific example, the decomposition module 608 can generate the decomposed information 320 for the public information 304 based on the public information 304 and the training set 316 compared according to the decomposition rule 314.

Continuing with the previous example, the public information 304 can represent the subject of the email, the timeframe 210 when the email was sent, the domain of email service used to send the email, or a combination thereof. The subject of the email can represent "Meeting." The timeframe 210 of when the email was sent can represent "Morning." The domain of the email service used to send the email can represent "Gmail™."

The decomposition module 608 can generate the decomposed information 320 by comparing each instances of content type 310 of the public information 304 to the corresponding instances of the content type 310 of the training set 316 according to the decomposition rule 314. As a result, the decomposition module 608 can generate the decomposed information 320 representing the intention category 318 of FIG. 3 of "Work" for the content type 310 representing the subject of email with the value of "Meeting" to indicate the email is work related. The decomposition module 608 can generate the decomposed information 320 representing the intention category 318 of "Work" for the content type 310 representing the timeframe 210 with the value of "Morning" to indicate that the email is work related. However, the decomposition module 608 can generate the decomposed information 320 representing the intention category 318 of "Personal" for the content type 310 representing the domain for email service with the value of "Gmail™" to indicate the email is non-work related.

For further example, the decomposition module 608 can generate the decomposed information 320 by comparing the each instances of the content type 310 of the encrypted information 308 to the corresponding instances of the content type 310 of the training set 316 for the encrypted information 308 according to the decomposition rule 314. Furthermore, the activity history 322 can indicate that the user had treated the private information 306 that is encrypted with the hash value of "2RTC" to represent a spam email. As a result, the decomposition module 608 can generate the decomposed information 320 representing the intention category 318 of "Spam" for the content type 310 representing the recipient of the email with the hash value of "2RTC" to indicate the email as non-work related, non-personal related, or a combination thereof.

For a different example, the decomposition module 608 can generate the decomposed information 320 based on the activity context 202, the decomposition rule 314, or a combination thereof. More specifically, the activity context 202 can represent watching a baseball game at a stadium. The content type 310 can represent a digital photograph taken at the stadium. The digital photograph can be encrypted as the encrypted information 308.

The training set 316 for the content type 310 of digital photograph taken in the activity context 202 of watching the baseball game can represent the intention category 318 of "Personal." Based on the activity context 202, the decomposition module 608 can generate the decomposed information 320 representing the intention category 318 of "Personal" even if the content type 310 is encrypted as the encrypted information 308. The decomposition module 608 can communicate the decomposed information 320 to a restoration module 610.

The electronic system 100 can include the restoration module 610, which can couple to the decomposition module 608. The restoration module 610 generates the restored information 324 of FIG. 3. For example, the restoration module 610 can generate the restored information 324 based on the mapping table 312, the decomposed information 320, or a combination thereof.

More specifically, the restoration module 610 can generate the restored information 324 by identifying the corresponding instance of the encrypted information 308 of the decomposed information 320 on the mapping table 312. For example, the mapping table 312 can include the key-pair value representing the encrypted information 308 and the private information 306 for the content type 310. The content type 310 can represent the recipient of the email. The encrypted information 308 can represent "2RTC" for the recipient of the email. The private information 306 can represent "John" for the recipient of the email.

The decomposed information 320 can include the value of "2RTC." The restoration module 610 can generate the restored information 324 by mapping the "2RTC" of the decomposed information 320 to the "2RTC" of the mapping table 312 to determine that "2RTC" represents "John." The restoration module 610 can generate the restored information 324 for each instances of the content type 310 by mapping the decomposed information 320 to the mapping table. The restoration module 610 can communicate the restored information 324 to a dashboard module 612.

It has been discovered that the electronic system 100 generating the restored information 324 can improve the privacy of the user operating the electronic system 100. By only disclosing the encrypted information 308 to the public, the user can keep the private information 306 private within the first device 102. And the electronic system 100 can only expose the private information 306 to the user him or herself once the decomposed information 320 is mapped the mapping table 312 to generate the restored information 324 to restore the original value of the private information 306. As a result, the user can share the information type 302 by controlling the information to be exposed for enhanced user experience of the first device 102, the electronic system 100, or a combination thereof.

The electronic system 100 can include the dashboard module 612, which can couple to the restoration module 610. The dashboard module 612 generates the activity dashboard 402 of FIG. 4. For example, the dashboard module 612 can generate the activity dashboard 402 based on the restored information 324, the decomposition rule 314, the activity context 202, or a combination thereof.

The dashboard module 612 can generate the activity dashboard 402 in a number of ways. For example, the dashboard module 612 can generate the activity dashboard 402 displaying the activity context 202 including the activity type 204, the user location 208, the timeframe 210, or a combination thereof. Moreover, the dashboard module 612 can generate the activity dashboard 402 displaying the calibration functionality 404 of FIG. 4 to receive the user entry 406 of FIG. 4 for adjusting the decomposition rule 314. The dashboard module 612 can communicate the activity dashboard 402 to a rule module 614.

The electronic system 100 can include the rule module 614, which can couple to the dashboard module 612. The rule module 614 updates the decomposition rule 314. For example, the rule module 614 can update the decomposition rule 314 based on the user entry 406.

For a specific example, the activity dashboard 402 can display the decomposed information 320 for the sender of the email with the encrypted information 308 of "WTY3" as "Spam." The corresponding instance of the private information 306 of the encrypted information 308 of "WTY3" can represent "Star Hotel." However, "Star Hotel" can represent the user's favorite hotel and should be categorized as "Personal" rather than "Spam." The user can make the user entry 406 via the calibration functionality 404 to adjust "Star Hotel" as "Personal" rather than "Spam." Based on the user entry 406, the rule module 614 can update the decomposition rule 314 for categorizing the encrypted information 308 of "WTY3" as "Personal" instead of "Spam." The rule module 614 can communicate the decomposition rule 314 updated to the decomposition module 608.

It has been discovered that the electronic system 100 updating the decomposition rule 314 improves the accuracy of categorizing the encrypted information 308 into the intention category 318. By allowing the user to make the user entry 406 to manipulate the calibration functionality 404, the electronic system 100 can improve the categorization of the encrypted information 308 without exposing the private information 306 to the public. As a result, the electronic system 100 can improve the categorization of the encrypted information 308 without compromising the user's privacy for operating the first device 102, the electronic system 100, or a combination thereof.

The physical transformation from changing the activity context 202 based on the change in the user location 208 results in the movement in the physical world, such as people using the first device 102, based on the operation of the electronic system 100. As the movement in the physical world occurs, the movement itself creates additional information that is converted back into generating the encrypted information 308, the decomposed information 320, the decomposition rule 314, or a combination thereof for the continued operation of the electronic system 100 and to continue movement in the physical world.

The first software 526 of FIG. 5 of the first device 102 of FIG. 5 can include the electronic system 100. For example, the first software 526 can include the context module 602, the encryption module 604, the map module 606, the decomposition module 608, the restoration module 610, the dashboard module 612, and the rule module 614.

The first control unit 512 of FIG. 5 can execute the first software 526 for the context module 602 to determine the activity context 202. The first control unit 512 can execute the first software 526 for the encryption module 604 to generate the encrypted information 308. The first control unit 512 can execute the first software 526 for the map module 606 to generate the mapping table 312. The first control unit 512 can execute the first software 526 for the decomposition module 608 to generate the decomposed information 320.

The first control unit 512 can execute the first software 526 for the restoration module 610 to generate the restored information 324. The first control unit 512 can execute the first software 526 for the dashboard module 612 to generate the activity dashboard 402. The first control unit 512 can execute the first software 526 for the rule module 614 to update the decomposition rule 314.

The second software 542 of FIG. 5 of the second device 106 of FIG. 5 can include the electronic system 100. For example, the second software 542 can include the context module 602, the encryption module 604, the map module 606, the decomposition module 608, the restoration module 610, the dashboard module 612, and the rule module 614.

The second control unit 534 of FIG. 5 can execute the second software 542 for the context module 602 to determine the activity context 202. The second control unit 534 can execute the second software 542 for the encryption module 604 to generate the encrypted information 308. The second control unit 534 can execute the second software 542 for the map module 606 to generate the mapping table 312. The second control unit 534 can execute the second software 542 for the decomposition module 608 to generate the decomposed information 320.

The second control unit 534 can execute the second software 542 for the restoration module 610 to generate the restored information 324. The second control unit 534 can execute the second software 542 for the dashboard module 612 to generate the activity dashboard 402. The second control unit 534 can execute the second software 542 for the rule module 614 to update the decomposition rule 314.

The electronic system 100 can be partitioned between the first software 526 and the second software 542. For example, the second software 542 can include the decomposition module 608. The second control unit 534 can execute modules partitioned on the second software 542 as previously described.

The first software 526 can include the context module 602, the encryption module 604, the map module 606, the restoration module 610, the dashboard module 612, and the rule module 614. Based on the size of the first storage unit 514, the first software 526 can include additional modules of the electronic system 100. The first control unit 512 can execute the modules partitioned on the first software 526 as previously described.

The first control unit 512 can operate the first communication interface 528 of FIG. 5 to communicate the activity context 202, the encrypted information 308, the decomposed information 320, the decomposition rule 314, or a combination thereof to or from the second device 106. The first control unit 512 can operate the first software 526 to operate the location unit 520. The second communication interface 550 of FIG. 5 to communicate the activity context 202, the encrypted information 308, the decomposed information 320, the decomposition rule 314, or a combination thereof to or from the first device 102. Furthermore, the dashboard module 612 can represent the first user interface 518 of FIG. 5, the second user interface 538 of FIG. 5, or a combination thereof.

The electronic system 100 describes the module functions or order as an example. The modules can be partitioned differently. For example, the dashboard module 612 and the rule module 614 can be combined. Each of the modules can operate individually and independently of the other modules. Furthermore, data generated in one module can be used by another module without being directly coupled to each other. For example, the decomposition module 608 can receive the activity context 202 from the context module 602.

The modules described in this application can be hardware implementation or hardware accelerators in the first control unit 512 or in the second control unit 534. The modules can also be hardware implementation or hardware accelerators within the first device 102 or the second device 106 but outside of the first control unit 512 or the second control unit 534, respectively as depicted in FIG. 5. However, it is understood that the first device 102, the second device 106, or a combination thereof can collectively refer to all hardware accelerators for the modules. Furthermore, the first device 102, the second device 106, or a combination thereof can be implemented as software, hardware, or a combination thereof.

The modules described in this application can be implemented as instructions stored on a non-transitory computer readable medium to be executed by the first device 102, the second device 106, or a combination thereof. The non-transitory computer medium can include the first storage unit 514, the second storage unit 546 of FIG. 5, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

The control flow 600 or a method 600 of operation of the electronic system 100 in an embodiment of the present invention. The method 600 includes: generating an encrypted information with a control unit based on encrypting an information type in a block 602; generating a mapping table including the encrypted information, the information type, or a combination thereof in a block 604; generating a restored information based on mapping a decomposed information of the encrypted information, categorized according to a decomposition rule, to a corresponding instance of the information type in the mapping table in a block 606; and displaying the restored information on an activity dashboard for receiving a user entry to calibrate the decomposition rule in a block 608.

It has been discovered that the electronic system 100 generating the encrypted information 308 based on encrypting the information type 302 improves the user's privacy for sharing the user's personal information. By generating the mapping table 312 including the encrypted information 308, the information type 302, or a combination thereof residing on the first device 102, the electronic system 100 can keep the private information 306 exposed within the first device 102 only. Further, by generating the restored information 324 based on mapping the decomposed information 320 of the encrypted information 308 to the corresponding instance of the information type 302 in the mapping table 312, the electronic system 100 can validate the accuracy of categorization according to the decomposition rule 312. As a result, the user can calibrate the decomposition rule 314 on the activity dashboard 402 for enhanced privacy for operating the first device 102, the electronic system 100, or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
a control unit configured to:
generate an encrypted information based on encrypting an information type,
generate a mapping table including the encrypted information, the information type, or a combination thereof,
receive a decomposed information representing a categorization of the encrypted information under an intention category as a result of a comparison of the encrypted information and a training set according to a decomposition rule, wherein the training set includes an activity history of calibrating the decomposition rule,
generate a restored information based on mapping the decomposed information of the encrypted information to a corresponding instance of the information type in the mapping table, and
a user interface, coupled to the control unit, configure to display the restored information on an activity dashboard for receiving a user entry to calibrate the decomposition rule.

2. The system as claimed in claim 1 wherein the control unit is configured to generate the encrypted information based on a content type of a private information for controlling the private information shared to a public.

3. The system as claimed in claim 1 wherein the control unit is configured to generate the mapping table pairing the encrypted information to a private information.

4. The system as claimed in claim 1 wherein the control unit is configured to generate the activity dashboard for displaying an activity context including an activity condition of when the information type is shared.

5. The system as claimed in claim 1 wherein the control unit is configured to determine an activity context based on an activity condition including a user location, a timeframe, or a combination thereof.

6. An electronic system comprising:
a communication interface configured to receive an encrypted information of an information type;
a control unit, coupled to the communication interface, configured to:
generate a decomposed information based on comparing the encrypted information to a training set according to a decomposition rule for categorizing the encrypted information in an intention category, wherein the training set includes an activity history of calibrating the decomposition rule,
receive an update of the decomposition rule based on a user entry for controlling the encrypted information being categorized as the decomposed information.

7. The system as claimed in claim 6 wherein the control unit is configured to generate the decomposed information based on comparing a content type of the encrypted information to a corresponding instance of the content type of the training set.

8. The system as claimed in claim 6 wherein the control unit is configured to generate the decomposed information based on an activity context for controlling a private information shared to a public.

9. The system as claimed in claim 6 wherein the control unit is configured to generate the decomposed information based on comparing a content type of a public information to a corresponding instance of the content type of the training set.

10. The system as claimed in claim 6 wherein the control unit is configured to receive the update of the decomposition rule based on the user entry for controlling the encrypted information categorized to the intention category representing a classification of a user's intent without revealing a content of the encrypted information.

11. A method of operation of an electronic system comprising:
generating an encrypted information with a control unit based on encrypting an information type;
generating a mapping table including the encrypted information, the information type, or a combination thereof;
receiving a decomposed information representing a categorization of the encrypted information under an intention category as a result of a comparison of the encrypted information and a training set according to a decomposition rule, wherein the training set includes an activity history of calibrating the decomposition rule;

generating a restored information based on mapping the decomposed information of the encrypted information to a corresponding instance of the information type in the mapping table; and displaying the restored information on an activity dashboard for receiving a user entry to calibrate the decomposition rule.

12. The method as claimed in claim 11 wherein generating the encrypted information includes generating the encrypted information based on a content type of a private information for controlling the private information shared to a public.

13. The method as claimed in claim 11 wherein generating the mapping table includes generating the mapping table pairing the encrypted information to a private information.

14. The method as claimed in claim 11 further comprising generating the activity dashboard for displaying an activity context including an activity condition of when the information type is shared.

15. The method as claimed in claim 11 further comprising determining an activity context based on an activity condition including a user location, a timeframe, or a combination thereof.

16. A method of operation of an electronic system comprising:

receiving an encrypted information of an information type;

generating a decomposed information based on comparing the encrypted information to a training set according to a decomposition rule for categorizing the encrypted information in an intention category, wherein the training set includes an activity history of calibrating the decomposition rule; and receiving an update of the decomposition rule based on a user entry with a control unit for controlling the encrypted information being categorized as the decomposed information.

17. The method as claimed in claim 16 wherein generating the decomposed information includes generating the decomposed information based on comparing a content type of the encrypted information to a corresponding instance of the content type of the training set.

18. The method as claimed in claim 16 wherein generating the decomposed information includes generating the decomposed information based on an activity context for controlling a private information shared to a public.

19. The method as claimed in claim 16 wherein generating the decomposed information includes generating the decomposed information based on comparing a content type of a public information to a corresponding instance of the content type of the training set.

20. The method as claimed in claim 16 wherein receiving the update includes receiving the update of the decomposition rule based on the user entry for controlling the encrypted information categorized to the intention category representing a classification of a user's intent without revealing a content of the encrypted information.

21. A non-transitory computer readable medium including instructions for execution by a control unit, the instructions, when executed by the control unit, cause performance of steps comprising:

generating an encrypted information based on encrypting an information type;

generating a mapping table including the encrypted information, the information type, or a combination thereof;

receiving a decomposed information representing a categorization of the encrypted information under an intention category as a result of a comparison of the encrypted information and a training set according to a decomposition rule, wherein the training set includes an activity history of calibrating the decomposition rule in a past;

generating a restored information based on mapping a decomposed information of the encrypted information to a corresponding instance of the information type in the mapping table; and displaying the restored information on an activity dashboard for receiving a user entry to calibrate the decomposition rule.

22. The non-transitory computer readable medium as claimed in claim 21 wherein generating the encrypted information includes generating the encrypted information based on a content type of a private information for controlling the private information shared to a public.

23. The non-transitory computer readable medium as claimed in claim 21 wherein generating the mapping table includes generating the mapping table pairing the encrypted information to a private information.

24. The non-transitory computer readable medium as claimed in claim 21, the instructions, when executed by the control unit, cause performance of the steps further comprising generating the activity dashboard for displaying an activity context including an activity condition of when the information type is shared.

25. The non-transitory computer readable medium as claimed in claim 21, the instructions, when executed by the control unit, cause performance of the steps further comprising determining an activity context based on an activity condition including a user location, a timeframe, or a combination thereof.

26. A non-transitory computer readable medium including instructions for execution by a control unit, the instructions, when executed by the control unit, cause performance of the steps comprising:

receiving an encrypted information of an information type;

generating a decomposed information based on comparing the encrypted information to a training set according to a decomposition rule for categorizing the encrypted information in an intention category, wherein the training set includes an activity history of calibrating the decomposition rule in a past; and receiving an update of the decomposition rule based on a user entry for controlling the encrypted information being categorized.

27. The non-transitory computer readable medium as claimed in claim 26 wherein generating the decomposed information includes generating the decomposed information based on comparing a content type of the encrypted information to a corresponding instance of the content type of the training set.

28. The non-transitory computer readable medium as claimed in claim 26 wherein generating the decomposed information includes generating the decomposed information based on an activity context for controlling a private information shared to a public.

29. The non-transitory computer readable medium as claimed in claim 26 wherein generating the decomposed information includes generating the decomposed information based on comparing a content type of a public information to a corresponding instance of the content type of the training set.

30. The non-transitory computer readable medium as claimed in claim 26 wherein receiving the update includes receiving the update of the decomposition rule based on the user entry for controlling the encrypted information categorized to the intention category representing a classification of a user's intent without revealing a content of the encrypted information.

\* \* \* \* \*